(12) United States Patent
Adams, Jr.

(10) Patent No.: US 7,255,379 B1
(45) Date of Patent: Aug. 14, 2007

(54) STRAINER GRIPPING AND LIFTING ASSEMBLY

(76) Inventor: Lawrence D. Adams, Jr., 271 Highway 1188, Hessmer, LA (US) 71341

( * ) Notice: Subject to any disclaimer, the term of this patent is extended or adjusted under 35 U.S.C. 154(b) by 0 days.

(21) Appl. No.: 10/872,525

(22) Filed: Jun. 22, 2004

(51) Int. Cl.
*A47J 45/00* (2006.01)
(52) U.S. Cl. ...................... 294/27.1; 248/211
(58) Field of Classification Search ............. 294/26, 294/27.1, 31.1, 32, 33; 16/422, 425; 248/210, 248/211, 94, 97, 312; 220/759, 695, 696, 220/751; D7/395, 622; 215/390, 395, 396; D32/54
See application file for complete search history.

(56) References Cited

U.S. PATENT DOCUMENTS

| | | | | |
|---|---|---|---|---|
| 506,173 | A * | 10/1893 | Gmelin | 294/27.1 |
| 864,372 | A | 8/1907 | Hoffmann et al. | |
| 902,236 | A * | 10/1908 | Kintz | 294/33 |
| 1,090,404 | A * | 3/1914 | Minke | 248/99 |
| 1,271,653 | A * | 7/1918 | Bergstrom | 248/100 |
| 1,924,451 | A * | 8/1933 | McClarkey | 294/27.1 |
| 2,098,996 | A * | 11/1937 | Blake et al. | 248/210 |
| 2,123,813 | A | 7/1938 | Stuko | |
| 2,358,599 | A * | 9/1944 | Schultz | 294/27.1 |
| 2,536,215 | A * | 1/1951 | Povondra | 220/759 |
| 2,542,737 | A * | 2/1951 | Vogel | 220/696 |
| 2,613,860 | A * | 10/1952 | Hoffman | 294/169 |
| 2,786,707 | A * | 3/1957 | Campbell | 294/34 |
| 3,300,167 | A * | 1/1967 | Malicoat | 248/210 |
| 3,981,044 | A | 9/1976 | Luebke et al. | |
| 4,053,131 | A * | 10/1977 | Francis | 248/211 |
| 4,138,341 | A * | 2/1979 | Adams | 248/94 |
| 4,513,936 | A | 4/1985 | Goulter | |
| D298,200 | S * | 10/1988 | Block et al. | 294/27.1 |
| 4,919,298 | A * | 4/1990 | Gregory | 220/736 |
| 5,113,549 | A * | 5/1992 | Villiano | 220/756 |
| 5,505,330 | A | 4/1996 | Nunes | |
| 6,102,458 | A * | 8/2000 | Scace | 294/34 |
| 6,266,849 | B1 * | 7/2001 | Petit et al. | 294/34 |
| D456,578 | S * | 4/2002 | Smith et al. | D32/54 |
| D468,583 | S | 1/2003 | Kerulis | |

* cited by examiner

*Primary Examiner*—Patrick Mackey
*Assistant Examiner*—Paul T Chin

(57) ABSTRACT

A strainer gripping and lifting assembly includes a generally horizontally orientated elongated member that has a first end and a second end. A hook member is attached to the second end of the elongated member and hangs downwardly from the elongated member. A stabilizer is attached to and extends downwardly from the elongated member. The stabilizer is positioned for selectively abutting a peripheral wall of a strainer basket when the hook member removably engages a handle of the strainer basket. A handhold is attached to an upper surface of the elongated member. The handhold is positioned generally adjacent to the first end of the elongated member.

11 Claims, 3 Drawing Sheets

STRAINER GRIPPING AND LIFTING ASSEMBLY

BACKGROUND OF THE INVENTION

1. Field of the Invention

The present invention relates to strainer gripping devices and more particularly pertains to a new strainer gripping device for engaging and lifting a straining basket from a pot of a hot fluid in such a manner to space a hand using the device from the pot.

2. Description of the Prior Art

The use of strainer and pot gripping devices is known in the prior art. U.S. Pat. No. 864,372 describes an elongated handle that is adapted for engaging a bracket on a particularly designed cooking pot so that a person may use the handle to engage the bracket and lift the pot. Another type of pot gripping device is U.S. Pat. No. 4,513,936 having an elongated rod terminating in a hook which may be used for engaging a pot handle so that the pot may be supported over a fire. A strainer gripping device is described in U.S. Pat. No. 3,981,044 and includes a particularly designed strainer having a slot therein for receiving engaging member attached to an elongated handle so that user of the device may lift the strainer while remaining distanced from a deep fat fryer.

While these devices fulfill their respective, particular objectives and requirements, the need remains for a device that can be used with more conventionally designed strainers so that they may be removed from a pot containing a hot fluid in such a manner that the person removing the strainer is able to keep their hands spaced from the hot fluid. The device should be adapted for working with most types of strainers with little or no modification.

SUMMARY OF THE INVENTION

The present invention meets the needs presented above by generally comprising a generally horizontally orientated elongated member that has a first end and a second end. A hook member is attached to the second end of the elongated member and hangs downwardly from the elongated member. A stabilizer is attached to and extends downwardly from the elongated member. The stabilizer is positioned for selectively abutting a peripheral wall of a strainer basket when the hook member removably engages a handle of the strainer basket. A handhold is attached to an upper surface of the elongated member. The handhold is positioned generally adjacent to the first end of the elongated member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
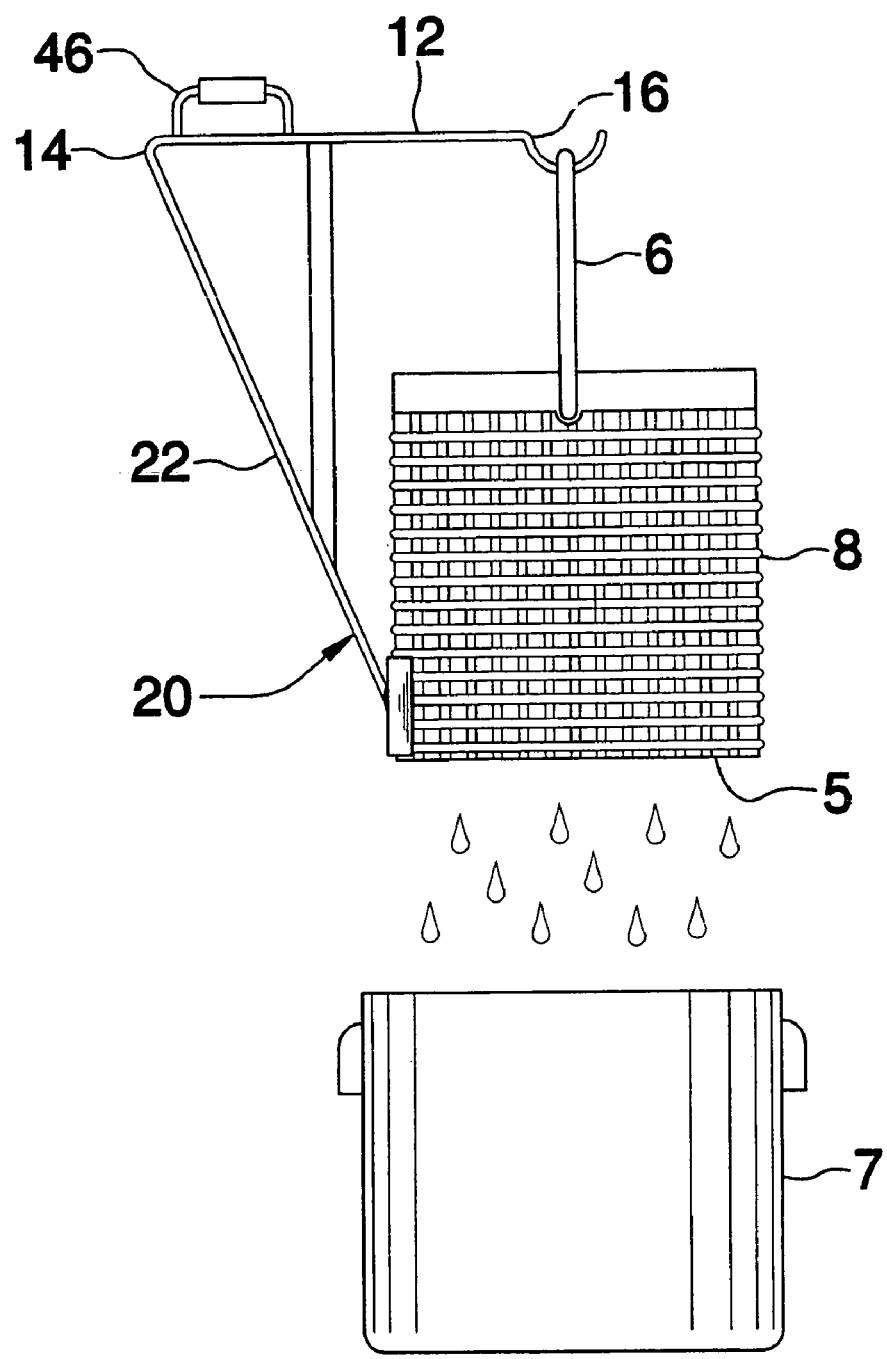
FIG. 1 is a side view of a strainer gripping and lifting assembly according to the present invention.
Figure 3:
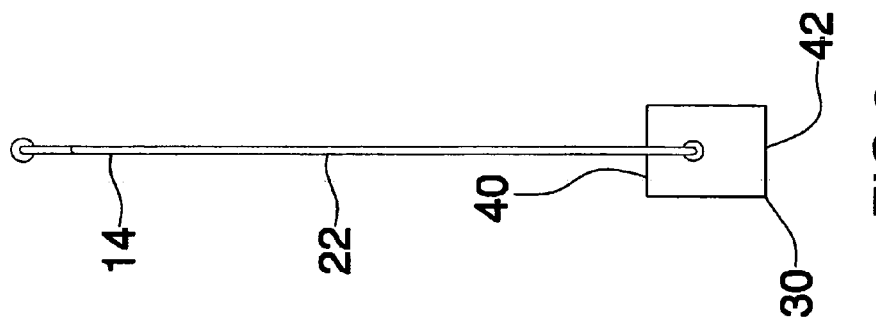
FIG. 3 is a back view of the present invention.
Figure 2:
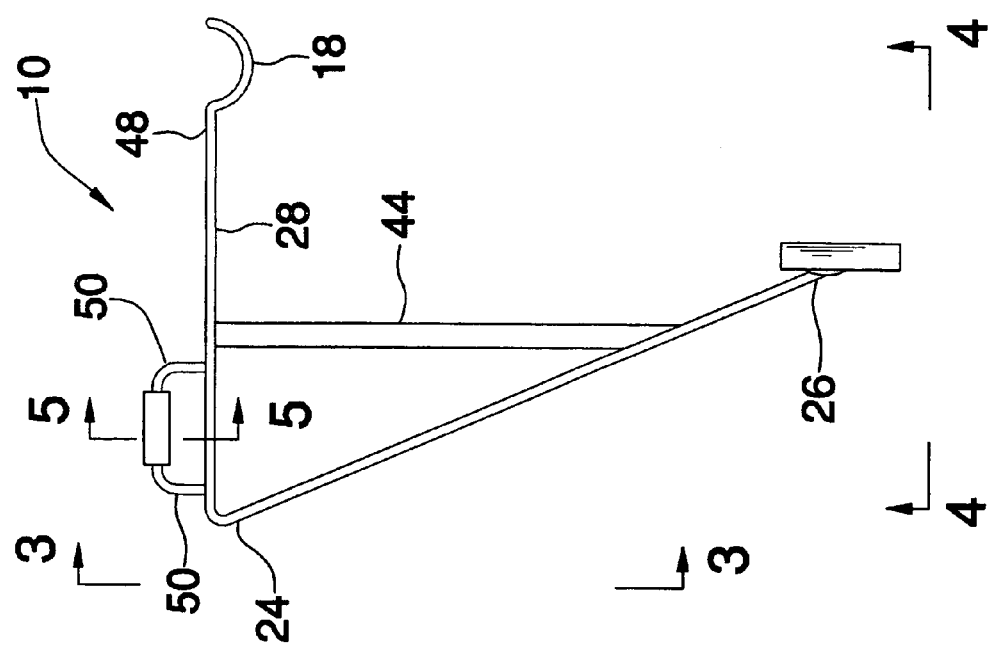
FIG. 2 is a side view of the present invention.
Figure 4:
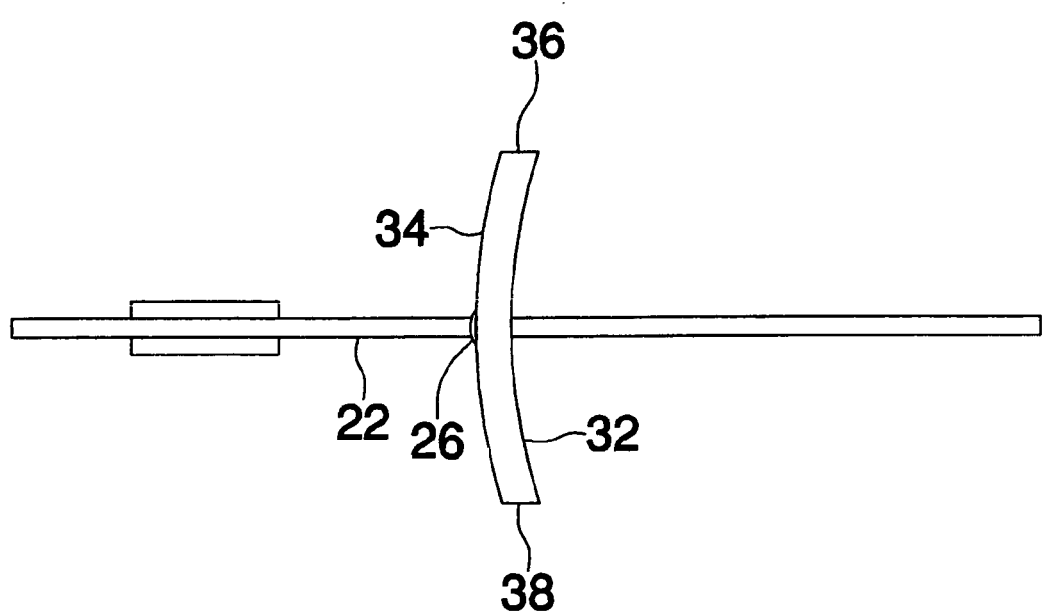
FIG. 4 is a bottom view of the present invention.
Figure 5:
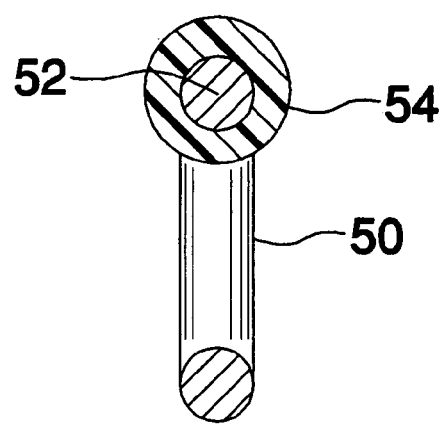
FIG. 5 is a cross-sectional view taken along line 5-5 of FIG. 2 of the present invention.

With reference now to the drawings, and in particular to FIGS. 1 through 5 thereof, a new strainer gripping device embodying the principles and concepts of the present invention and generally designated by the reference numeral 10 will be described.

As best illustrated in FIGS. 1 through 5, the strainer gripping and lifting assembly 10 generally comprises a device adapted for selectively engaging a handle 6 of a strainer basket 5 of the type conventionally used in water boiling pots 7 and deep fat frying pots. The basket 5 has a peripheral wall 8 and the handle 6 extends across an upper portion of the basket 5. The assembly 10 includes an elongated member 12 that is generally horizontally orientated. The elongated member 12 has a first end 14 and a second end 16. The elongate member 12 preferably has a length generally between 12 inches and 20 inches.

A hook member 18 is attached to the second end 16 of the elongated member 12. The hook member 18 hangs downwardly from the elongated member 12 and preferably extends forward of the elongated member 12.

A stabilizer 20 is attached to and extends downwardly from the elongated member 12. The stabilizer 20 is positioned for selectively abutting the peripheral wall 8 of the basket 5 when the hook member 18 removably engages the handle 6. This ensures that the basket 5 remains upright and prevents excessive movement of the basket 5 which could spray boiling water or hot oil.

The stabilizer 20 includes a leg 22 that has an upper end 24 and a lower end 26. The upper end 24 is attached to a bottom surface 28 of the elongated member 12 and is positioned generally adjacent to the first end 14 of the elongated member 12. The leg 22 is angled with respect to the elongated member 12 and an angle between the leg 22 and the elongated member 12 is less than 80 degrees and greater than 40 degrees. This places the lower end 26 below and between the first 14 and second 16 ends of the elongated member 12. A first vertical line extending through the lower end 26 and a second vertical line extending through the hook member 18 is spaced from each other a distance generally between 6 inches and 12 inches. A plate 30 has a front side 32, a back side 34, a first side edge 36, a second side edge 38, a top edge 40 and a bottom edge 42. The back side 34 is attached to the leg 22 adjacent to the lower end 26 such that the plate 30 is vertically orientated. The front side 32 is concave from the first side edge 36 to the second side edge 38 to better conform to the peripheral wall 8 of the strainer 5. The top edge 40 is spaced from the elongated member 12 generally between 6 inches and 12 inches and the bottom edge 42 is spaced from the elongated member 12 generally between 18 inches and 24 inches. A brace 44 is attached to and extends between the elongated member 12 and the leg 22.

A handhold 46 is attached to an upper surface 48 of the elongated member 12. The handhold 46 is positioned generally adjacent to the first end 14 of the elongated member 12. The handhold 46 comprises a pair of vertical supports 50 that are attached to and extend upwardly from the elongated member 12. A central portion 52 extends between upper ends of the vertical supports 50. A gripping member 54 is attached to and extends around the central portion 52. The gripping member 54 preferably comprises an insulating material such as a heat resistant plastic.

In use, the hook 18 engages the handle 6, and the plate 30 is run along the pot 7 and then abuts the basket 5 when a sufficient portion of the basket 5 has cleared the pot 7. The user then lifts the assembly 10, along with the basket 5, so that the basket 5 is removed from the pot 7. The fluid contained in the basket 5 is allowed to drain into the pot 7 while the user's hand remains a safe distance from the basket 5.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lifting tool for selectively engaging a handle of a strainer basket, the basket having a peripheral wall, said tool comprising:
    a substantially horizontally orientated elongated member having a first end and a second end;
    a hook member being attached to said second end of said elongated member, said hook member hanging downwardly from said elongated member;
    a stabilizer being attached to and extending downwardly from said elongated member, said stabilizer abutting the peripheral wall of the basket and said hook member removably engaging the handle of the strainer basket, said stabilizer comprising;
        a leg having an upper end and a lower end, said upper end being attached to a bottom surface of said elongated member and being positioned adjacent to said first end of said elongated member, said leg being angled with respect to said elongated member and an angle between said leg and said elongated member being less than 80 degrees;
        a plate having a front side, a back side, a first side edge, a second side edge, a top edge and a bottom edge, said back side being attached to said leg adjacent to said lower end such that said plate is vertically orientated; and
    a handhold being attached to an upper surface of said elongated member, said handhold being positioned adjacent to said first end of said elongated member, a lowermost portion of said stabilizer being laterally spaced from each of said hook member and said handhold.

2. The tool according to claim 1, wherein said elongate member has a length generally between 12 inches and 20 inches.

3. The tool according to claim 1, wherein said front side of said plate is concave from said first side edge to said second side edge.

4. The tool according to claim 3, wherein said top edge of said plate is spaced from said elongated member between 6 inches and 12 inches, said bottom edge being spaced from said elongated member between 18 inches and 24 inches.

5. The tool according to claim 4, wherein said lower end of said leg and said hook member are laterally spaced from each other a distance between 6 inches and 12 inches.

6. The tool according to claim 5, wherein said elongate member has a length between 12 inches and 20 inches.

7. The tool according to claim 1, further including a brace being attached to and extending between said elongated member and said leg, a longitudinal axis of said brace being positioned between said handhold and said hook member, said brace being orientated substantially perpendicular to said elongated member.

8. The tool according to claim 7, wherein said handhold comprises a pair of vertical supports being attached to and extending upwardly from said elongated member, a central portion extending between upper ends of said vertical supports, a gripping member being attached to and extending around said central portion, said elongated member being orientated substantially parallel to said central portion.

9. The tool according to claim 1, wherein said handhold comprises a pair of vertical supports being attached to and extending upwardly from said elongated member, a central portion extending between upper ends of said vertical supports, a gripping member being attached to and extending around said central portion, said elongated member being orientated substantially parallel to said central portion.

10. The tool according to claim 9, wherein said central portion is orientated parallel to said elongated member.

11. A lifting tool for selectively engaging a handle of a strainer basket, the basket having a peripheral wall, said tool comprising:
    a substantially horizontally orientated elongated member having a first end and a second end, said elongate member having a length between 12 inches and 20 inches;
    a hook member being attached to said second end of said elongated member, said hook member hanging downwardly from said elongated member;
    a stabilizer being attached to and extending downwardly from said elongated member, said stabilizer being positioned for selectively abutting the peripheral wall of the basket when said hook member removably engages the handle of the strainer basket, a lowermost portion of said stabilizer being laterally spaced from each of said hook member and said handhold, said stabilizer comprises;
        a leg having an upper end and a lower end, said upper end being attached to a bottom surface of said elongated member and being positioned adjacent to said first end of said elongated member, said leg being angled with respect to said elongated member and an angle between said leg and said elongated member being less than 80 degrees and greater than 40 degrees, a first vertical line extending through said lower end and a second vertical line extending through said hook member being spaced from each other a distance between 6 inches and 12 inches;
        a plate having a front side, a back side, a first side edge, a second side edge, a top edge and a bottom edge, said back side being attached to said leg adjacent to said lower end such that said plate is vertically orientated, said front side being concave from said first side edge to said second side edge, said top edge being spaced from said elongated member between 6 inches and 12 inches, said bottom edge being spaced from said elongated member between 18 inches and 24 inches;

a brace being attached to and extending between said elongated member and said leg;

a handhold being attached to an upper surface of said elongated member, said handhold being positioned adjacent to said first end of said elongated member, said handhold comprising a pair of vertical supports being attached to and extending upwardly from said elongated member, a central portion extending between upper ends of said vertical supports; and a gripping member being attached to and extending around said central portion.

* * * * *